(12) United States Patent
Watanabe

(10) Patent No.: US 8,931,967 B2
(45) Date of Patent: Jan. 13, 2015

(54) IMAGING APPARATUS

(75) Inventor: Kentaro Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 13/444,602

(22) Filed: Apr. 11, 2012

(65) Prior Publication Data

US 2012/0269505 A1    Oct. 25, 2012

(30) Foreign Application Priority Data

Apr. 19, 2011   (JP) ................. 2011-093242

(51) Int. Cl.
*G03B 9/08* (2006.01)
*H04N 5/232* (2006.01)
*G03B 9/36* (2006.01)

(52) U.S. Cl.
CPC .............. *G03B 9/36* (2013.01); *H04N 5/23245* (2013.01); *H04N 5/23241* (2013.01)
USPC ........................................................ 396/465

(58) Field of Classification Search
CPC ...................................................... G03B 9/369
USPC ........................................................ 396/465
See application file for complete search history.

(56) References Cited

U.S. PATENT DOCUMENTS

| | | | |
|---|---|---|---|
| 7,907,206 B2* | 3/2011 | Toyoda | 348/367 |
| 8,025,449 B2* | 9/2011 | Moriyama et al. | 396/465 |
| 2001/0010560 A1 | 8/2001 | Takahashi | |
| 2005/0063698 A1* | 3/2005 | Usuda et al. | 396/489 |
| 2005/0110897 A1 | 5/2005 | Wakabayashi | |
| 2006/0221223 A1* | 10/2006 | Terada | 348/333.05 |
| 2011/0194018 A1* | 8/2011 | Kosaka | 348/349 |
| 2012/0106945 A1* | 5/2012 | Kawakami | 396/497 |

FOREIGN PATENT DOCUMENTS

| | | |
|---|---|---|
| CN | 102006418 A | 4/2011 |
| JP | 2765747 B2 | 6/1998 |
| JP | 2006-078924 A | 3/2006 |
| JP | 2009-162941 A | 7/2009 |

* cited by examiner

*Primary Examiner* — W B Perkey
*Assistant Examiner* — Linda B Smith
(74) *Attorney, Agent, or Firm* — Canon USA Inc IP Division

(57) ABSTRACT

When an imaging apparatus performs normal image-capturing, an energization control unit energizes a driving source to move a body release lever from a locking position to a releasing position, and then does not energize the driving source. When the imaging apparatus performs continuous image-capturing, the energization control unit energizes the driving source to move the body release lever from the locking position to the releasing position, and then energizes the driving source to regulate bounding of the body release lever.

10 Claims, 13 Drawing Sheets

IMAGING APPARATUS

BACKGROUND OF THE INVENTION

1. Field of the Invention

The present disclosure relates to an imaging apparatus, and more particularly to an imaging apparatus in which a body release lever is operated by a driving source.

2. Description of the Related Art

There has conventionally been known a configuration where a shutter blade is held by a shutter fastening mechanism after completion of charging a shutter device by a shutter charging mechanism, and the shutter blade is stopped in a traveling preparation state in which the charging state set by the shutter charging mechanism has been released.

Japanese Patent No. 2765747 discusses a configuration where a fastening lever of a shutter is pressed to an armature to be held by a holding lever after shutter charging, and a body release lever holding the holding lever is released from the outside before shutter traveling.

In the configuration discussed in Japanese Patent No. 2765747, the body release lever is continuously pressed by a body release releasing lever interlocking with up-and-down movement of a mirror after its locking with the holding lever is released by the body release releasing lever. In such a conventional configuration, the body release lever never moves immediately before or during shutter traveling.

When a body release actuator operates the body release releasing lever independently of the up-and-down movement of the mirror, the following problems occur.

By energizing the body release actuator, the locking of the holding lever by the body release lever is released. Then, when the energization of the body release actuator is stopped, the body release lever bounds without its movement being regulated.

This problem can be solved by traveling a leading blade after the end of bounding of the body release lever. In this case, however, a release time lag becomes longer, consequently reducing a frame speed during continuous imaging.

To regulate the movement of the body release lever after the locking of the holding lever by the body release lever has been released, the body release actuator can be continuously energized. In this case, however, energization time to the body release actuator becomes longer, consequently increasing power consumption.

SUMMARY OF THE INVENTION

According to an aspect of the present disclosure, an imaging apparatus includes a release lever in which an armature is provided, an electromagnet configured to attract the armature by being energized, a holding lever configured to move between a holding position where the release lever is held so that the armature contacts the electromagnet, and a retracting position where the release lever is retracted out of a moving locus thereof, a biasing member configured to urge the holding lever to the retracing position, a body release lever configured to move between a locking position where the holding lever is locked in the holding position against a biasing force of the biasing member and a releasing position where locking of the holding lever is released, a driving source configured to move the body release lever from the locking position to the releasing position, and an energization control unit configured to control energization of the driving source, wherein the energization control unit has a first control mode and a second control mode, wherein in the first control mode, after the driving source is energized to move the body release lever from the locking position to the releasing position, the driving source is not energized, wherein in the second control mode, after the driving source is energized to move the body release lever from the locking position to the releasing position, the driving source is energized to regulate bounding of the body release lever, and wherein the energization control unit controls energization of the driving source in the first control mode when the imaging apparatus executes normal image-capturing, and controls the energization of the driving source in the second control mode when the imaging apparatus executes continuous image-capturing.

The present disclosure provides an imaging apparatus that limits the increase of power consumption of the body release actuator to a minimum by preventing a release time lag from becoming longer.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects will be described in detail below with reference to the drawings.

Figure 1:
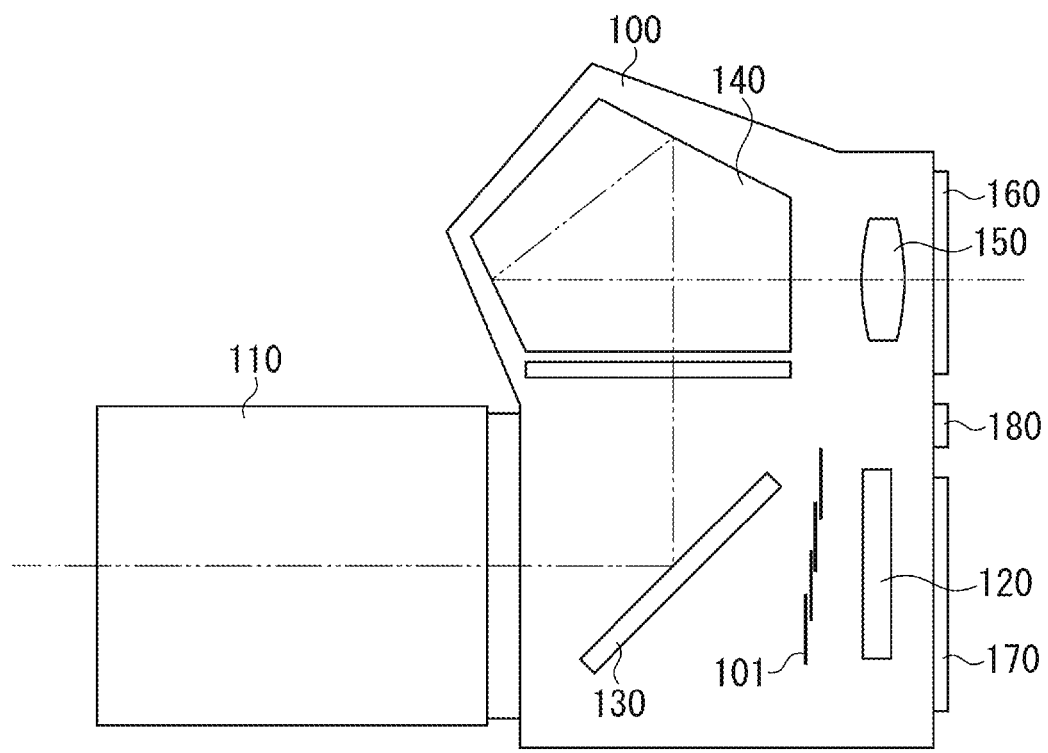
FIG. 1 illustrates an overall configuration of a digital camera as an example of an imaging apparatus.

FIG. 1 illustrates an overall configuration of a digital camera as an example of an imaging apparatus according to the present disclosure. In FIG. 1, an imaging lens 110 is configured to be detachable from a digital camera body 100. The digital camera body 100 includes a quick return mirror 130 that moves back and forth in an imaging optical path for guiding an imaging light flux passed through the imaging lens 110 to an image sensor 120, and a shutter unit 101 disposed to set an imaging surface of the image sensor 120 in an exposed or shielded state.

As shown in FIG. 1, when the quick return mirror 130 has entered the imaging optical path, the imaging light flux is guided to a pentaprism 140 located in the upper part of the digital camera body 100. The pentaprism 140 converts an incident object image into an upright normal image to output it to a view finder optical system 150. This enables a photographer to check the object image from an eyepiece unit 160.

During image-capturing, the quick return mirror 130 retracts from the imaging optical path, thus causing the shutter unit 101 to expose the imaging surface of the image sensor 120. The imaging light flux accordingly enters the image sensor 120.

At a display unit 170, the photographer can display a captured image to check it, or check a setting state of the camera body 100. At an operation unit 180, the photographer can switch a camera's imaging mode to any one of a single imaging mode for executing normal imaging, a low-speed continuous imaging mode for executing low-speed continuous imaging, and a high-speed continuous imaging mode for executing high-speed continuous imaging.

Figure 2A:
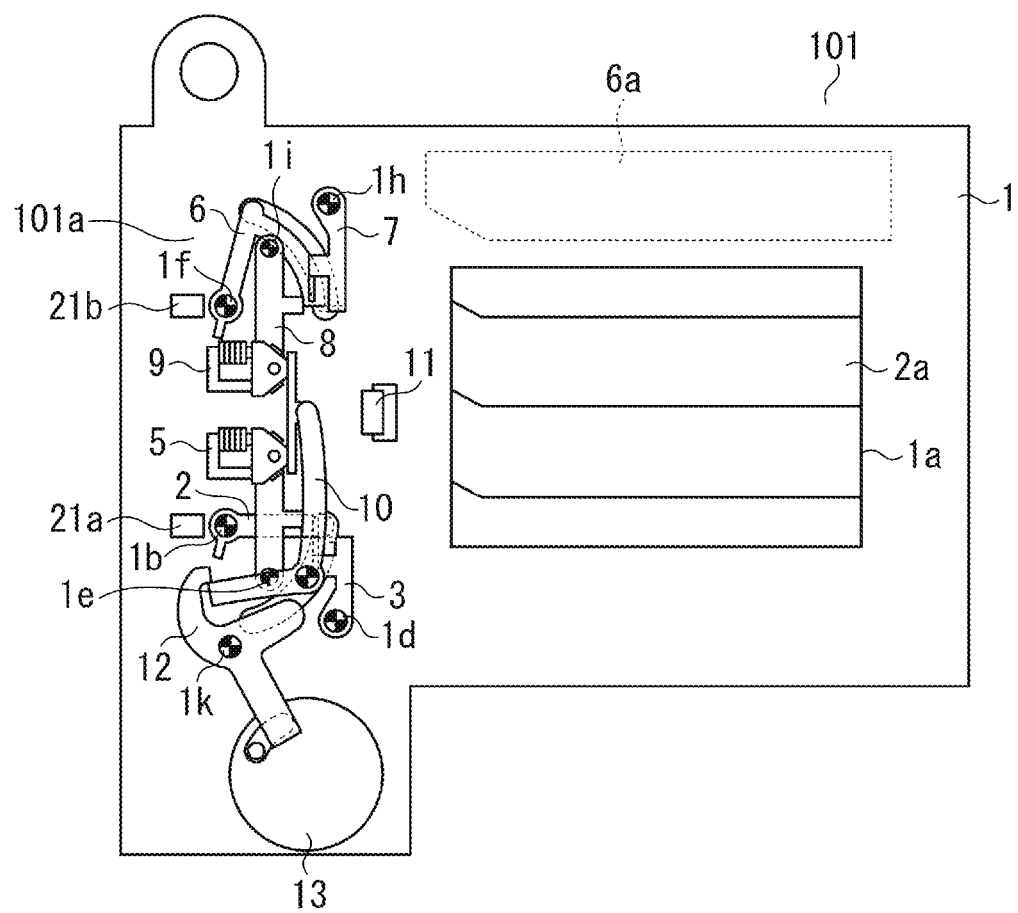
FIGS. 2A and 2B are plan views when a shutter unit 101 disposed in a digital camera body 100 is seen from an object side.

FIG. 2A is a plan view when the shutter unit 101 disposed in the digital camera body 100 is seen from an object side. In FIG. 2A, the shutter unit 101 is in a leading blade before-traveling state. As illustrated in FIG. 2A, a base plate 1 includes an aperture 1a formed to pass an object light flux. Components constituting a driving mechanism of a leading blade group 2a and a trailing blade group 6a are attached to the base plate 1, and a shutter driving part 101a is also attached.

Figure 2B:
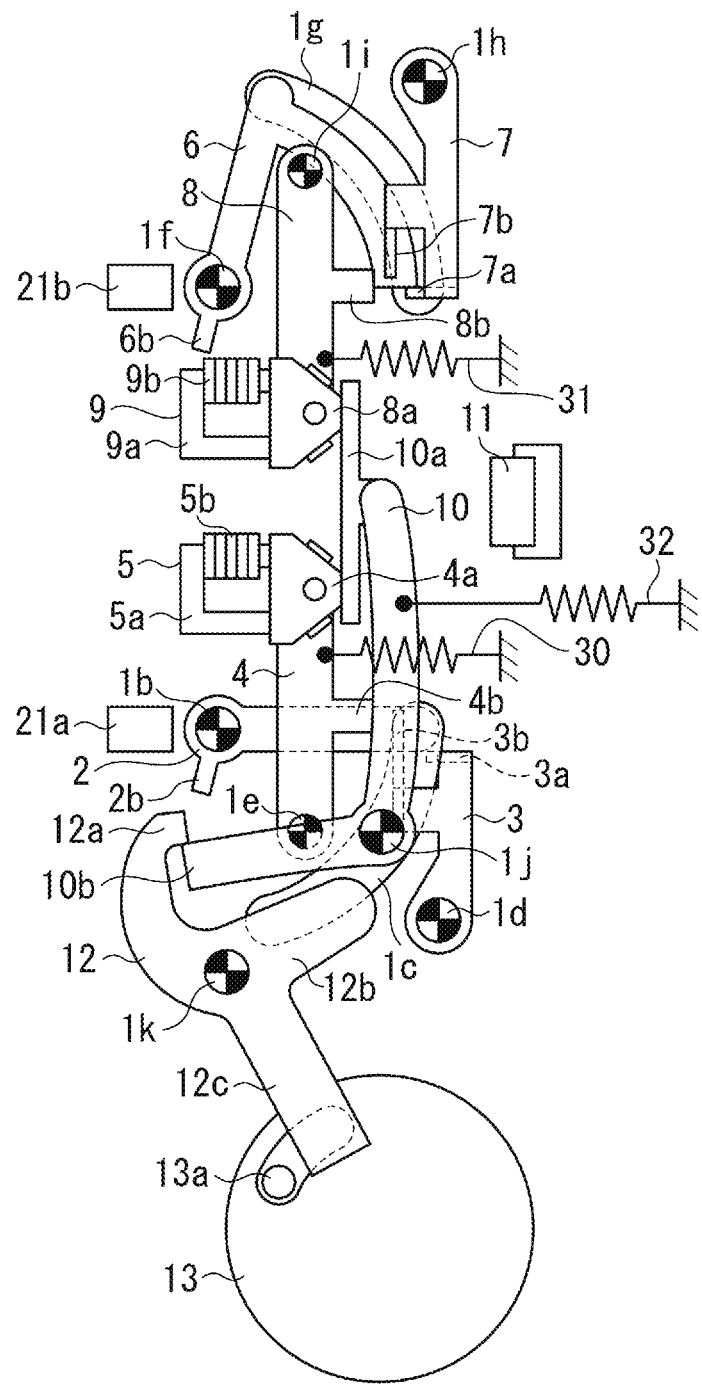

FIG. 2B illustrates the enlarged shutter driving part 101a of the shutter unit 101 illustrated in FIG. 2A. In FIG. 2B, therefore, the shutter driving part 101a is in a leading blade before-traveling state.

In FIG. 2B, a leading blade shaft 1b formed on the surface of the shutter base plate 1 supports a leading blade driving lever 2 to be rotatable. A twist coil spring (not illustrated) is disposed on the outer circumference of the leading blade shaft 1b. This twist coil spring presses the leading blade driving lever 2 clockwise (direction where the leading blade group 2a travels) illustrated in FIG. 2B.

A leading blade driving pin (not illustrated) is formed at the leading end of the leading blade driving lever 2. The leading blade driving pin penetrates a leading blade groove 1c formed in the shutter base plate 1 to be engaged with a leading blade driving arm (not illustrated). The leading blade driving arm is connected to the leading blade group 2a via a linking mechanism. The leading blade group 2a includes a plurality of shutter blades.

When the leading blade driving lever 2 is rotated to move the leading blade driving pin along the leading blade groove 1c, the leading blade driving arm rotates to spread or overlap the plurality of shutter blades constituting the leading blade group 2a. A rotational range of the leading blade driving lever 2 is limited by the leading blade groove 1c.

In the leading blade before-traveling state illustrated in FIG. 2B, the leading blade driving lever 2 is locked by a leading blade locking part 3a of a leading blade locking lever 3. The leading blade locking lever 3 rotates around a leading blade locking shaft 1d formed on the surface of the shutter base plate 1.

A twist coil spring (not illustrated) is disposed around the leading blade locking shaft 1d. This twist coil spring presses the leading blade locking lever 3 anticlockwise in FIG. 2B. When a leading blade locking pressed part 3b is pressed against the biasing force of the twist coil spring, the locking of the leading blade driving lever 2 by the leading blade locking part 3a is released.

A leading blade release lever 4 rotates around a leading blade release shaft 1e formed on the shutter base plate 1. A leading blade armature 4a is attached to the leading end of the leading blade release lever 4. A spring 30 is hooked on the leading blade release lever 4. The spring 30 presses the leading blade release lever 4 clockwise (direction away from a leading blade electromagnet 5 described below) illustrated in FIG. 2B.

A leading blade locking pressing part 4b is formed with the leading blade release lever 4. When the leading blade release lever 4 is rotated by the biasing force of the spring 30, the leading blade locking pressing part 4b presses the leading blade locking pressed part 3b.

The leading blade electromagnet 5 includes a leading blade yoke 5a and a leading blade coil 5b. When a voltage is applied to the leading blade coil 5b, a magnetic force is generated at the leading blade yoke 5a. By this magnetic force, the leading blade yoke 5a can attract the leading blade armature 4a.

A voltage is applied to the leading blade electromagnet 5 so that the leading blade armature 4a can be attracted by a force lager than the biasing force of the spring 30 pressing the leading blade release lever 4. When the voltage application to the leading blade coil 5b is stopped, there is no more force to attract the leading blade armature 4a, and the leading blade release lever 4 is rotated clockwise by the biasing force of the spring 30.

A trailing blade shaft 1f formed on the surface of the shutter base plate 1 supports a trailing blade driving lever 6 to be rotatable. A twist coil spring (not illustrated) is arranged on the outer circumference of the trailing blade shaft 1f. This twist coil spring presses the trailing blade driving lever 6 clockwise (direction where a trailing blade group 6a travels) illustrated in FIG. 2A.

A trailing blade driving pin (not illustrated) is formed at the leading end of the trailing blade driving lever 6. The trailing blade driving pin penetrates a trailing blade groove 1g formed in the shutter base plate 1 to be engaged with a trailing blade driving arm (not illustrated). The trailing blade driving arm is connected to the trailing blade group 6a via a linking mechanism. The trailing blade group 6a includes a plurality of shutter blades.

When the trailing blade driving lever 6 is rotated to move the trailing blade driving pin along the trailing blade groove 1g, the trailing blade driving arm rotates to spread or overlap the plurality of shutter blades constituting the trailing blade group 6a with each other.

By the operation of the leading blade group 2a and the operation of the trailing blade group 6a, the aperture 1a can be opened or closed. A rotational range of the trailing blade driving lever 6 is limited by the trailing blade groove 1g.

In the leading blade before-traveling state illustrated in FIG. 2B, the trailing blade driving lever 6 is locked by a trailing blade locking part 7a of a trailing blade locking lever 7. The trailing blade locking lever 6 rotates around a trailing blade locking shaft 1h formed on the surface of the shutter base plate 1.

A twist coil spring (not illustrated) is arranged around the trailing blade locking shaft 1h. This twist coil spring presses the trailing blade locking lever 7 clockwise in FIG. 2B. When a trailing blade locking pressed part 7b is pressed against the biasing force of the twist coil spring, the locking of the trailing blade driving lever 6 by the trailing blade locking part 7a is released.

A trailing blade release lever 8 rotates around a trailing blade release shaft 1i formed on the shutter base plate 1. A trailing blade armature 8a is attached to the leading end of the trailing blade release lever 8. A spring 31 is hooked in the trailing blade release lever 8. The spring 31 presses the trailing blade release lever 8 anticlockwise (direction away from a trailing blade electromagnet 9 described below) illustrated in FIG. 2B.

A trailing blade locking pressing part 8*b* is formed in the trailing blade release lever 8. When the trailing blade release lever 8 is rotated by a biasing force of the spring 31, the trailing blade locking pressing part 8*b* presses the trailing blade locking pressed part 7*b*.

The trailing blade electromagnet 9 includes a trailing blade yoke 9*a* and a trailing blade coil 9*b*. When a voltage is applied to the trailing blade coil 9*b*, a magnetic force is generated at the trailing blade yoke 9*a*. With this magnetic force, the trailing blade yoke 9*a* can attract the trailing blade armature 8*a*.

A voltage is applied to the trailing blade electromagnet 9 so that the trailing blade armature 8*a* can be attracted by a force lager than the biasing force of the spring 31 pressing the trailing blade release lever 8. When the voltage application to the trailing blade coil 9*b* is stopped, there is no more force to attract the trailing blade armature 8*a*, and the trailing blade release lever 8 is rotated clockwise by the biasing force of the spring 31.

A holding lever 10 is supported to be rotatable around a holding lever shaft 1*j* formed on the shutter base plate 1. A twist coil spring 32 is disposed on the outer circumference of the holding lever shaft 1*j*. This twist coil spring 32 functions as a pressing member to press the holding lever 10 clockwise in FIG. 2B.

A moving range of the holding lever 10 is limited by a holding lever stopping member 11. The holding lever stopping member 11, which is made of an elastic member such as rubber, suppresses bounding cause by collision of the holding member 10 with the holding lever stopping member 11.

More specifically, the holding member 10 moves between a position of holding the leading blade release lever 4 to bring the leading blade armature 4*a* into contact with the leading blade electromagnet 5 and a position of retracting out of a moving locus of the leading blade release lever 4.

An armature holding part 10*a* is formed at the leading end of the holding lever 10. The armature holding part 10*a* and the holding lever 10 are connected to move relative to one another by very small amounts via an elastic member.

In the state illustrated in FIG. 2B, the armature holding part 10*a* presses the leading blade armature 4*a* and the trailing blade armature 8*a* anticlockwise in FIG. 2B to respectively bring them into contact with the leading blade electromagnet 5 and the trailing blade electromagnet 9. In the state illustrated in FIG. 2B, therefore, irrespective of voltage application to the leading blade coil 5*b* and the trailing blade coil 9*b*, the leading blade armature 4*a* is brought into contact with the leading blade electromagnet 5, and the trailing blade armature 8*a* is brought into contact with the trailing blade electromagnet 9.

A holding lever locking part 10*b* is formed in the holding lever 10. The holding lever locking part 10*b* is locked with a body release lever locking part 12*a* formed in a body release lever 12 to hold the holding lever 10 in the state illustrated in FIG. 2B.

The body release lever 12 rotates around a body release shaft 1*k* formed on the shutter base plate 1. A twist coil spring (not illustrated) is arranged on the outer circumference of the body release shaft 1*k*. This twist coil spring presses the body release lever 12 clockwise in FIG. 2B. In other words, the body release lever 12 moves between a position of locking the holding lever 10 in a holding position against the biasing force of the twist coil spring 32 and a position of releasing the locking.

A body release actuator 13 includes a body release lever driving part 13*a* and a return spring (not illustrated). When the body release actuator 13 becomes unenergized, the body release lever driving part 13*a* is returned to an unenergized position by a biasing force of the return spring.

When the body release actuator 13 is energized, the body release lever driving part 13*a* rotates clockwise in FIG. 2B against the biasing force of the return spring. In other words, the body release actuator 13 functions as a driving source for moving the body release lever 12 from the locking position to the releasing position.

A bound suppressing part 12*b* is formed in the body release lever 12. The bound suppressing part 12*b* abuts on the bounding holding lever 10 to press the holding lever 10 to the holding lever stopping member 11.

In the digital camera body 100 according to the present exemplary embodiment, when the release button is turned on to perform an image-capturing operation, the shutter unit 101 can select whether to execute a first operation sequence or a second operation sequence.

First, a case of executing the first operation sequence by the shutter unit 101 by turning the release button on is described. The first operation sequence is an example of a first control mode.

The leading blade before-traveling state illustrated in FIG. 2B is an image-capturing standby state where the release button is not on.

Figure 3:
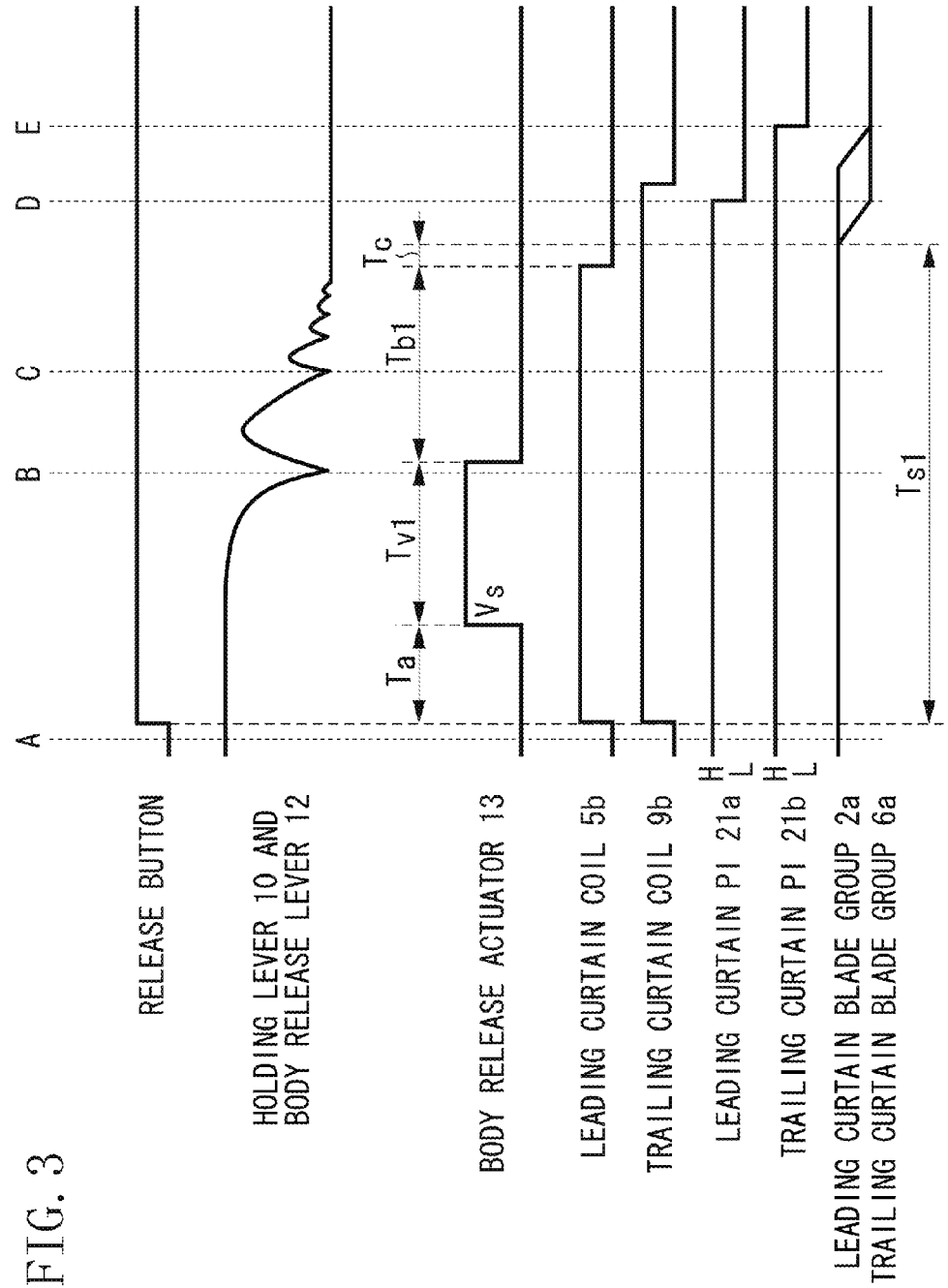
FIG. 3 is a timing chart illustrating a first operation sequence of the shutter unit 101.

FIG. 3 is a timing chart illustrating the first operation sequence. The leading blade before-traveling state illustrated in FIGS. 2A and 2B corresponds to a state A in the timing chart of FIG. 3.

When the release button is turned on, a central processing unit (CPU) of the digital camera body 100 executes control to apply voltages to the leading blade coil 5*b* of the leading blade electromagnet 5 and to the trailing blade coil 9*b* of the trailing blade electromagnet 9.

After time Ta has elapsed from the voltage application to the leading blade coil 5*b* and the trailing blade coil 9*b*, the CPU of the digital camera body 100 applies a voltage Vs to the body release actuator 13 to drive it. In the present exemplary embodiment, the CPU of the digital camera body 100 functions as an example of an energization control unit.

When the CPU of the digital camera body 100 drives the body release actuator 13, the body release lever driving part 13*a* rotates clockwise in FIG. 2B against the biasing force of the return spring.

The body release lever driving part 13*a*, which has been rotated clockwise, presses a body release lever pressed part 12*c* formed in the body release lever 12 to rotate the body release lever 12 anticlockwise. This releases engagement between the body release lever locking part 12*a* and the holding lever locking part 10*b*.

Figure 4:
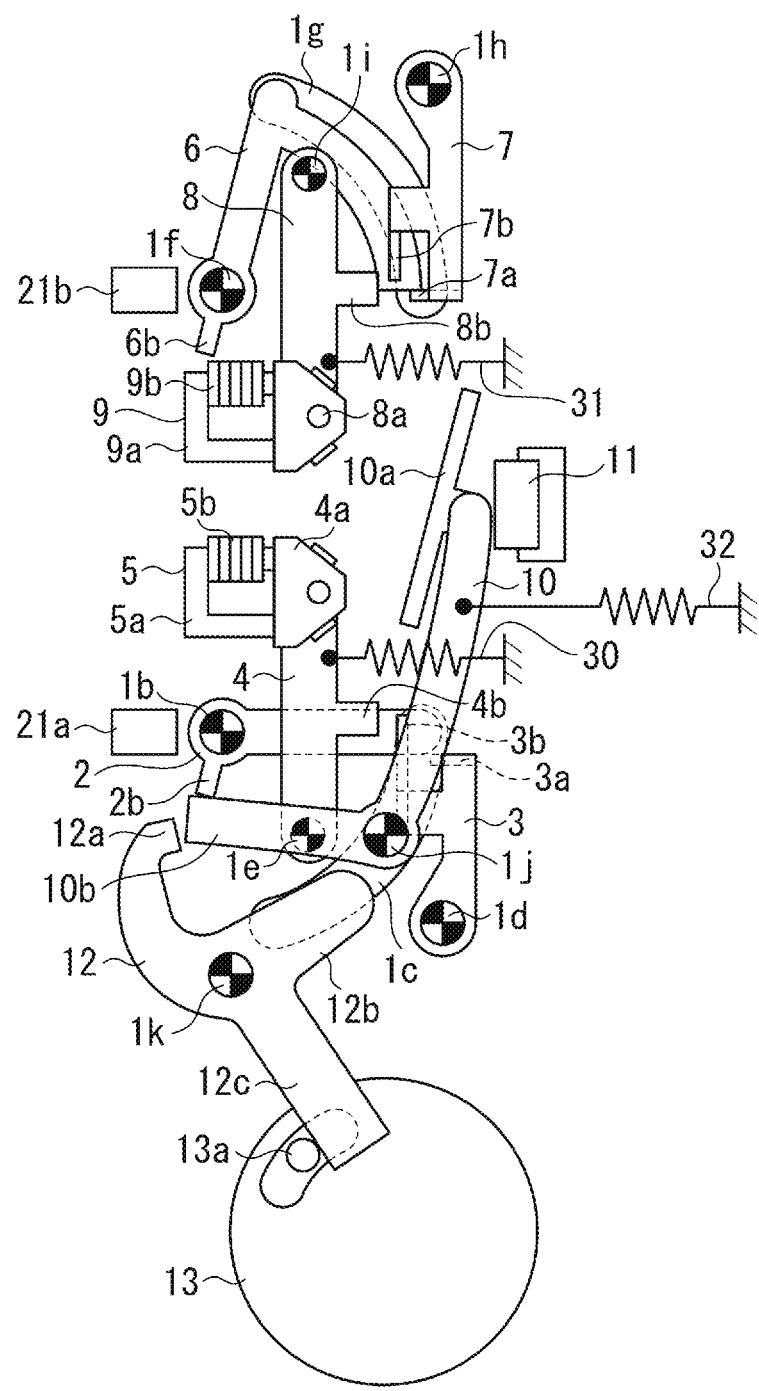
FIG. 4 is a plan view when a shutter driving part 101a of the shutter unit 101 is set in a state B illustrated in FIG. 3.

The holding lever 10 is separated from the leading blade armature 4*a* and the trailing blade armature 8*a* by the biasing force of the twist coil spring, and collides with the holding lever stopping member 11 to be set in a state illustrated in FIG. 4. The state illustrated in FIG. 4 corresponds to a state B in the timing chart of FIG. 3.

As described above, the CPU of the digital camera body 100 applies the voltages to the leading blade coil 5*b* and the trailing blade coil 9*b* before it starts voltage application to the body release actuator 13. Thus, even when the holding lever 10 is separated from the leading blade armature 4*a* and the trailing blade armature 8*a*, as illustrated in FIG. 4, the leading blade armature 4a is attracted by the leading blade electromagnet 5, and the trailing blade armature 8a is attracted by the trailing blade electromagnet 9.

After time Tv1 has elapsed from the state illustrated in FIG. 4, the CPU of the digital camera body 100 stops the voltage application to the body release actuator 13. When the body release actuator 13 is not energized, the body release driving part 13a is rotated anticlockwise by the biasing force of the return spring to be set in a state illustrated in FIG. 5. The state illustrated in FIG. 5 corresponds to a state C in the timing chart of FIG. 3.

When the digital camera body 100 executes the first operation sequence, to suppress power consumption, energization time to the body release actuator 13 is set to a minimum time. More specifically, the time Tv1 is a minimum time necessary for releasing the engagement between the body release locking part 12a and the holding lever locking part 10b by rotating the body release lever 12 anticlockwise.

In this case, the holding lever 10 collides with the holding lever stopping member 11 and bounds. The bounding holding lever 10 abuts on the bound suppressing part 12b of the body release lever 12.

Figure 5:
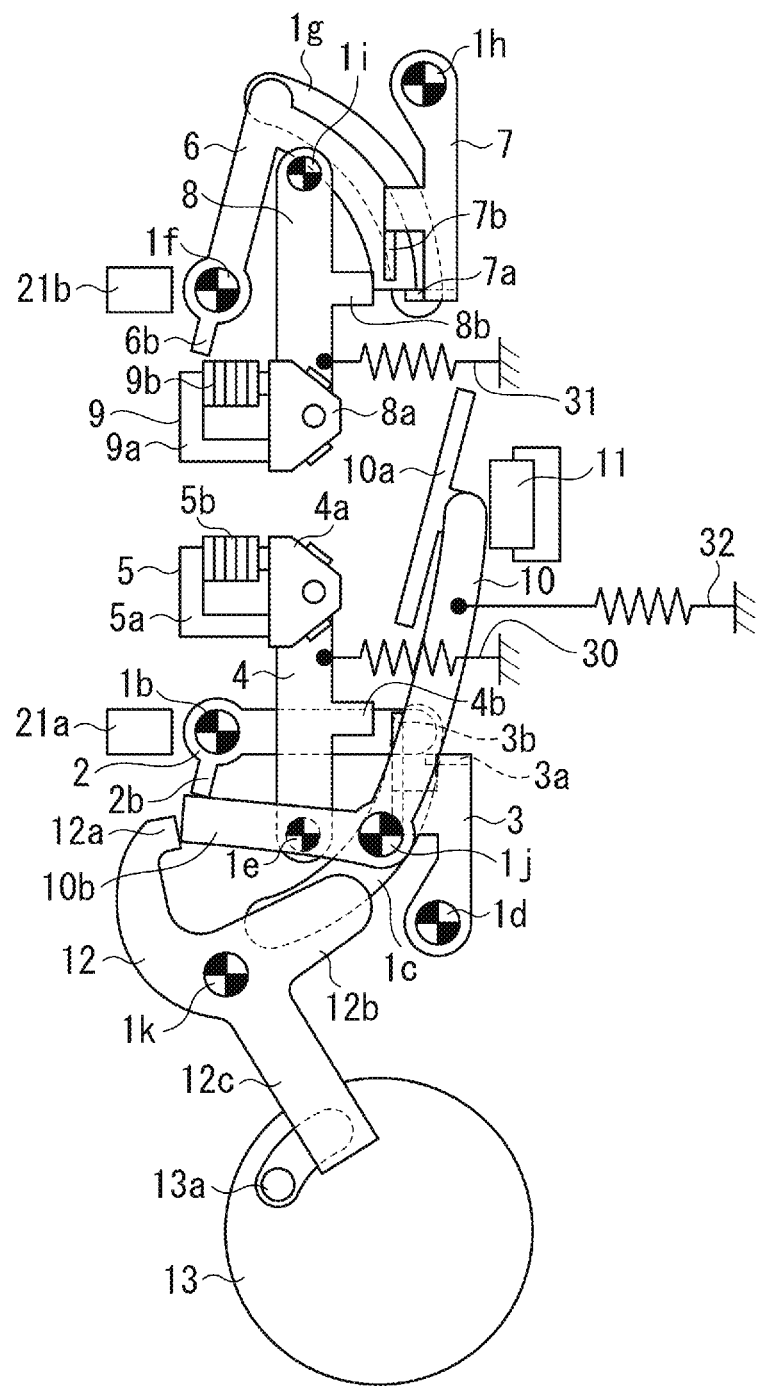
FIG. 5 is a plan view when the shutter driving part 101a of the shutter unit 101 is set in a state C illustrated in FIG. 3.

However, since the body release actuator 13 is unenergized, and the body release lever driving part 13a is set in the state illustrated in FIG. 5, the body release lever driving part 13a cannot regulate the rotation of the body release lever 12. In other words, in the state illustrated in FIG. 5, the body release lever 12 does not sufficiently function to suppress the bounding of the holding lever 10.

When the voltage applied to the leading blade coil 5b is cut off while the holding lever 10 is bounding, the leading blade release lever 4 may collide with the bounding holding lever 10 before it releases engagement between the leading blade locking lever 3 and the leading blade driving lever 2.

Similarly, for the trailing blade, the trailing blade release lever 8 may collide with the bounding holding lever 10 before it releases engagement between the trailing blade locking lever 7 and the trailing blade driving lever 6. Such a collision greatly affects traveling of the leading blade group 2a and the trailing blade group 6a.

Thus, as illustrated in FIG. 3, after time Tb1 when the bounding of the holding lever 10 ends has elapsed from unenergization of the body release actuator 13 by the CPU of the digital camera body 100, the voltage applied to the leading blade coil 5b is cut off.

After the CPU of the digital camera body 100 has cut off the voltage to the leading blade coil 5b, the leading blade armature 4a is separated from the leading blade electromagnet 5, and the leading blade release lever 4 is rotated clockwise by the biasing force of the spring 30.

Figure 6:
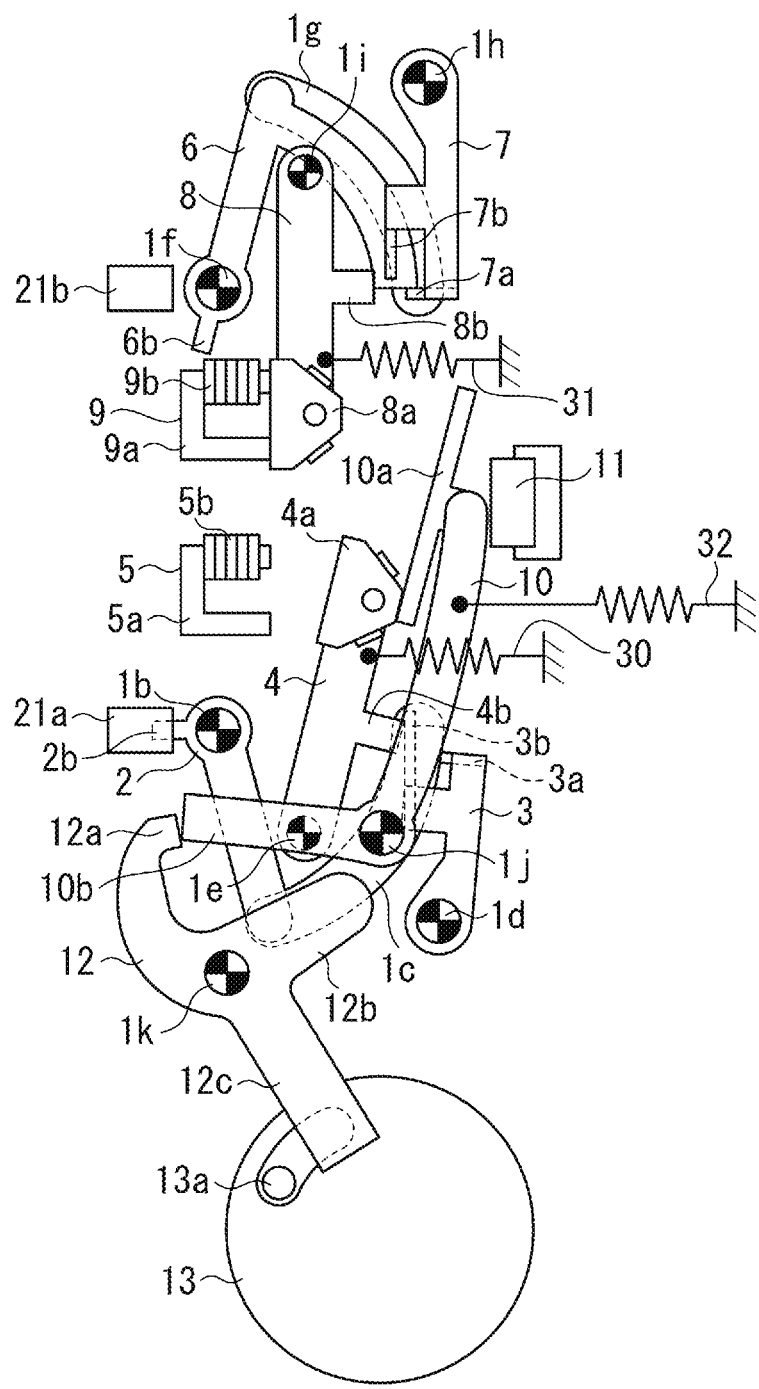
FIG. 6 is a plan view when the shutter driving part 101a of the shutter unit 101 is set in a state D illustrated in FIG. 3.

When the leading blade release lever 4 rotates, the leading blade locking pressing part 4b presses the leading blade locking pressed part 3b. When the leading blade locking pressed part 3b is pressed, the leading blade locking lever 3 rotates clockwise to release engagement between the leading blade locking part 3a and the leading blade driving lever 2. The leading blade driving lever 2 rotates clockwise to be set in a leading blade traveling completion state illustrated in FIG. 6. The state illustrated in FIG. 6 corresponds to a state D in the timing chart of FIG. 3.

As illustrated in FIG. 5, a light shielding part 2b is formed in the leading blade driving lever 2. When the leading blade driving lever 2 is set in the leading blade traveling completion state, a leading blade PI (Photo-Interrupter) 21a detects the light shielding part 2b, and an output signal of the leading blade PI 21a changes from H to L.

At timing determined based on the exposure time set after the CPU of the digital camera body 100 has cut off the voltage applied to the leading blade coil 5b, the CPU of the digital camera body 100 cuts off the voltage applied to the trailing blade coil 9b.

After the CPU of the digital camera body 100 has cut off the voltage applied to the trailing blade coil 9b, the trailing blade armature 8a is separated from the trailing blade electromagnet 9, and the trailing blade release lever 8 is rotated anticlockwise by the biasing force of the spring 31.

When the trailing blade release lever 8 rotates, the trailing blade locking pressing part 8b presses the trailing blade locking pressed part 7b. When the trailing blade locking pressed part 7b is pressed, the trailing blade locking lever 7 rotates anticlockwise to release engagement between the trailing blade locking part 7a and the trailing blade driving lever 6. The trailing blade driving lever 6 rotates clockwise to be set in a trailing blade traveling completion state illustrated in FIG. 7. The state illustrated in FIG. 7 corresponds to a state E in the timing chart of FIG. 3.

Figure 7:
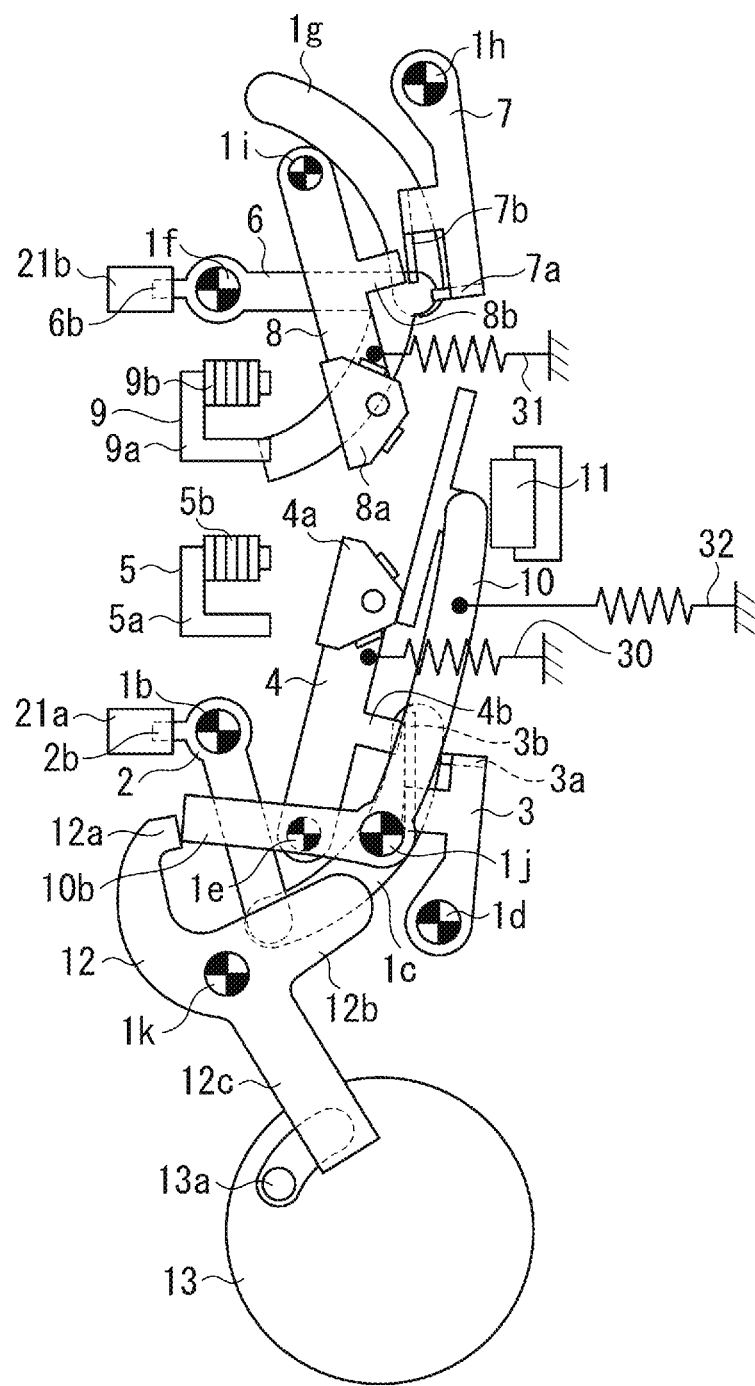
FIG. 7 is a plan view when the shutter driving part 101a of the shutter unit 101 is set in a state E illustrated in FIG. 3.

As illustrated in FIG. 7, a light shielding part 6b is formed in the trailing blade driving lever 6. When the trailing blade driving lever 6 is set in the trailing blade traveling completion state, a trailing blade PI (Photo-Interrupter) 21b detects the light shielding part 6b, and an output signal of the trailing blade PI 21b changes from H to L.

The timing chart of FIG. 3 illustrates time Tc from unenergization of the leading blade coil 5b to releasing of the light shielding state of the aperture 1a by the leading blade group 2a. In the first operation sequence, time Ts1 illustrated in FIG. 3 is a release time lag.

As described above, in the first operation sequence, the energization time of the body release actuator 13 is limited to the minimum while the time for ending the bounding of the holding lever 10 is longer. As a result, power consumption of the digital camera body 100 can be suppressed.

Next, a case of executing the second operation sequence by the shutter unit 101 by turning the release button on is described. The second operation sequence is an example of a second control mode.

Figure 8:
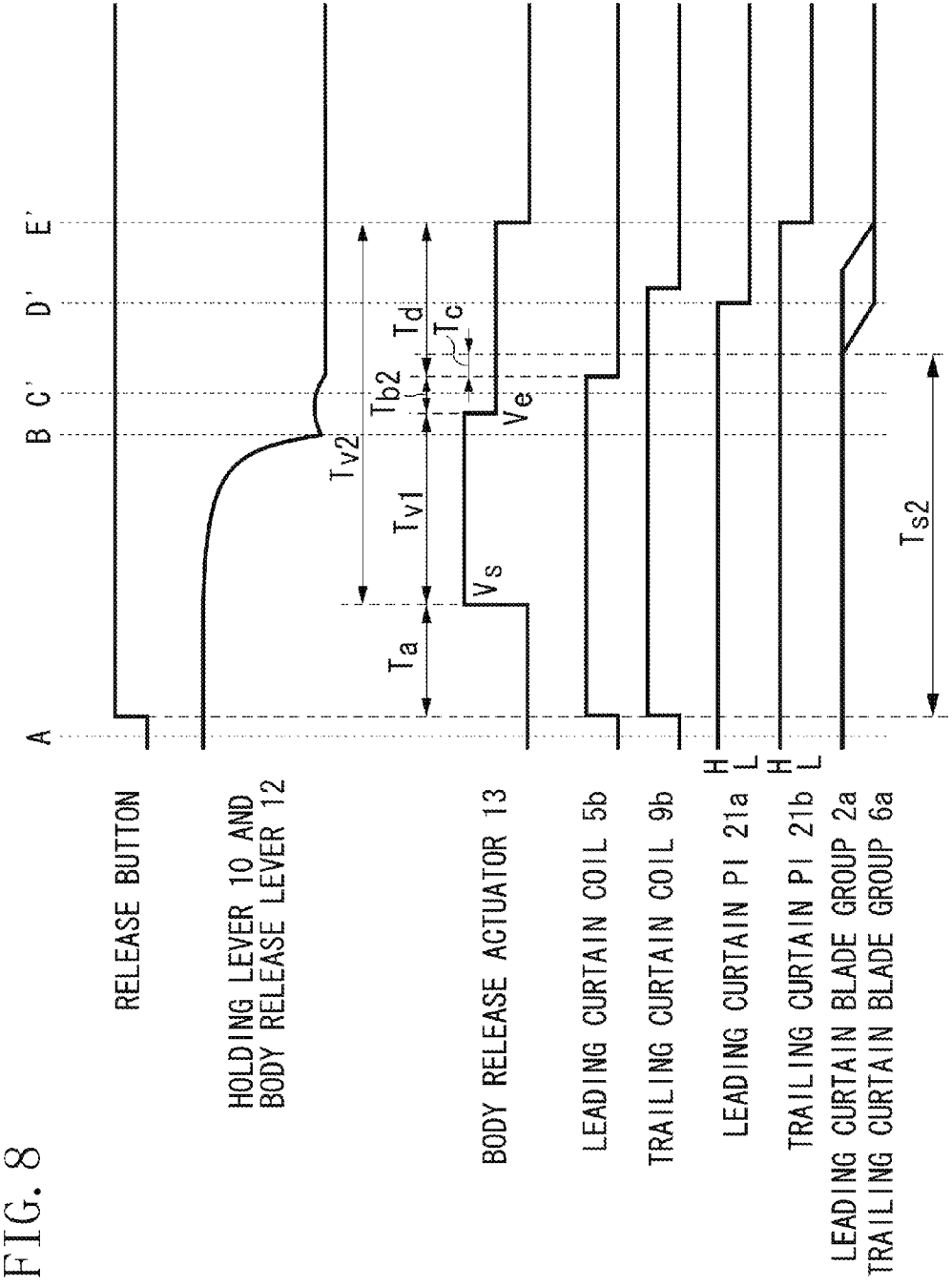
FIG. 8 is a timing chart illustrating a second operation sequence of the shutter unit 101.

The leading blade before-traveling state illustrated in FIG. 2B is an image-capturing standby state where the release button is not on. FIG. 8 is a timing chart illustrating the second operation sequence. The leading blade before-traveling state illustrated in FIGS. 2A and 2B corresponds to a state A in the timing chart of FIG. 8.

An operation from the state A to a state B in the timing chart of FIG. 8 is similar to that from the state A to the state B in the timing chart of FIG. 3. Thus, the state illustrated in FIG. 4 corresponds to the state B in the timing chart of FIG. 8.

After time Tv1 has elapsed from the state illustrated in FIG. 4, the CPU of the digital camera body 100 changes a voltage applied to the body release actuator 13 from Vs to Ve. The voltage Vs is a voltage necessary for releasing engagement between the body release lever locking part 12a and the holding lever locking part 10b. In other words, the voltage Vs is an example of an energization amount of the body release actuator 13 when the body release lever 12 is moved from the locking position to the releasing position.

On the other hand, the voltage Ve is a voltage necessary for rotating the body release lever 12 against the biasing force of the return spring to regulate the rotation of the body release lever 12. The voltage Ve is set smaller than the voltage Vs. In other words, the voltage Ve is an example of an energization amount of the body release actuator 13 when energization is carried out to regulate bounding of the body release lever 12.

Thus, an energization amount of the body release actuator 13 when energization is carried out to regulate the bounding of the body release lever 12 is smaller than that of the body release actuator 13 when energization is carried out to move the body release lever 12 from the locking position to the releasing position.

The holding lever 10 abuts, even when it collides with the holding lever stopping member 11 to bound, on the bound suppressing part 12b of the body release lever 12. In this case, the voltage Ve is applied to the body release actuator 13. The body release lever driving part 13a is accordingly held in a position illustrated in FIG. 9 against the biasing force of the return spring to regulate clockwise rotation of the body release lever 12.

Figure 9:
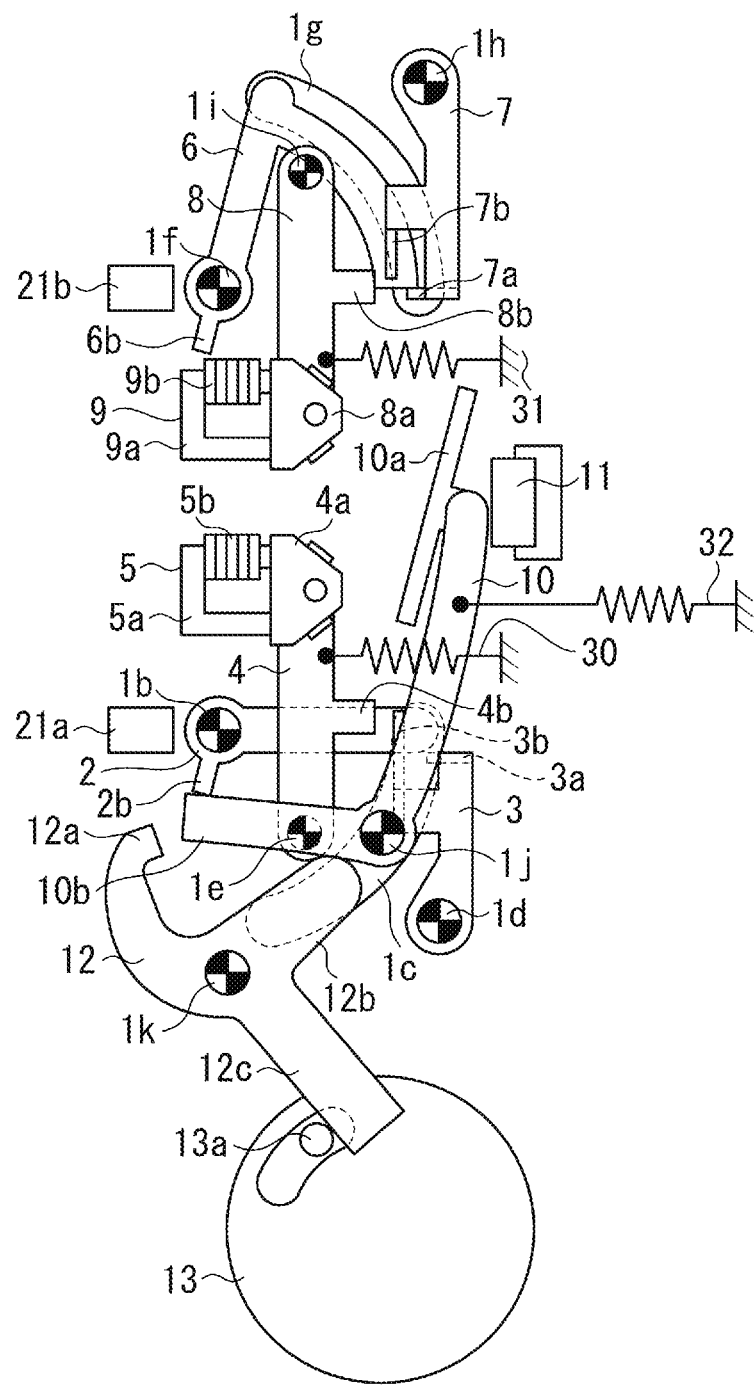
FIG. 9 is a plan view when the shutter driving part 101a of the shutter unit 101 is set in a state C' illustrated in FIG. 3.

Thus, as illustrated in FIG. 9, one end of the holding lever 10 abuts on the holding lever stopping member 11, and the other end abuts on the bound suppressing part 12b, thereby suppressing bounding of the holding lever 10 and the body release lever 12. The state illustrated in FIG. 9 corresponds to a state C' in the timing chart of FIG. 8.

As illustrated in FIG. 8, the CPU of the digital camera body 100 waits until time Tb2 for stabilizing the holding lever 10 elapses after the changing of the voltage applied to the body release actuator 13 from Vs to Ve. The CPU of the digital camera body 100 then cuts off a voltage applied to the leading blade coil 5b. The time Tb2 is set sufficiently shorter than the bound ending time Tb1 in the first operation sequence.

After the CPU of the digital camera body 100 has cut off the voltage applied to the leading blade coil 5b, the leading blade armature 4a is separated from the leading blade electromagnet 5, and the leading blade release lever 4 is rotated clockwise by the biasing force of the spring 30.

When the leading blade release lever 4 rotates, the leading blade locking pressing part 4b presses the leading blade locking pressed part 3b. When the leading blade locking pressed part 3b is pressed, the leading blade locking lever 3 rotates clockwise to release engagement between the leading blade locking part 3a and the leading blade driving lever 2. The leading blade driving lever 2 rotates clockwise to be set in a leading blade traveling completion state illustrated in FIG. 10. The state illustrated in FIG. 10 corresponds to a state D' in the timing chart of FIG. 8.

Figure 10:
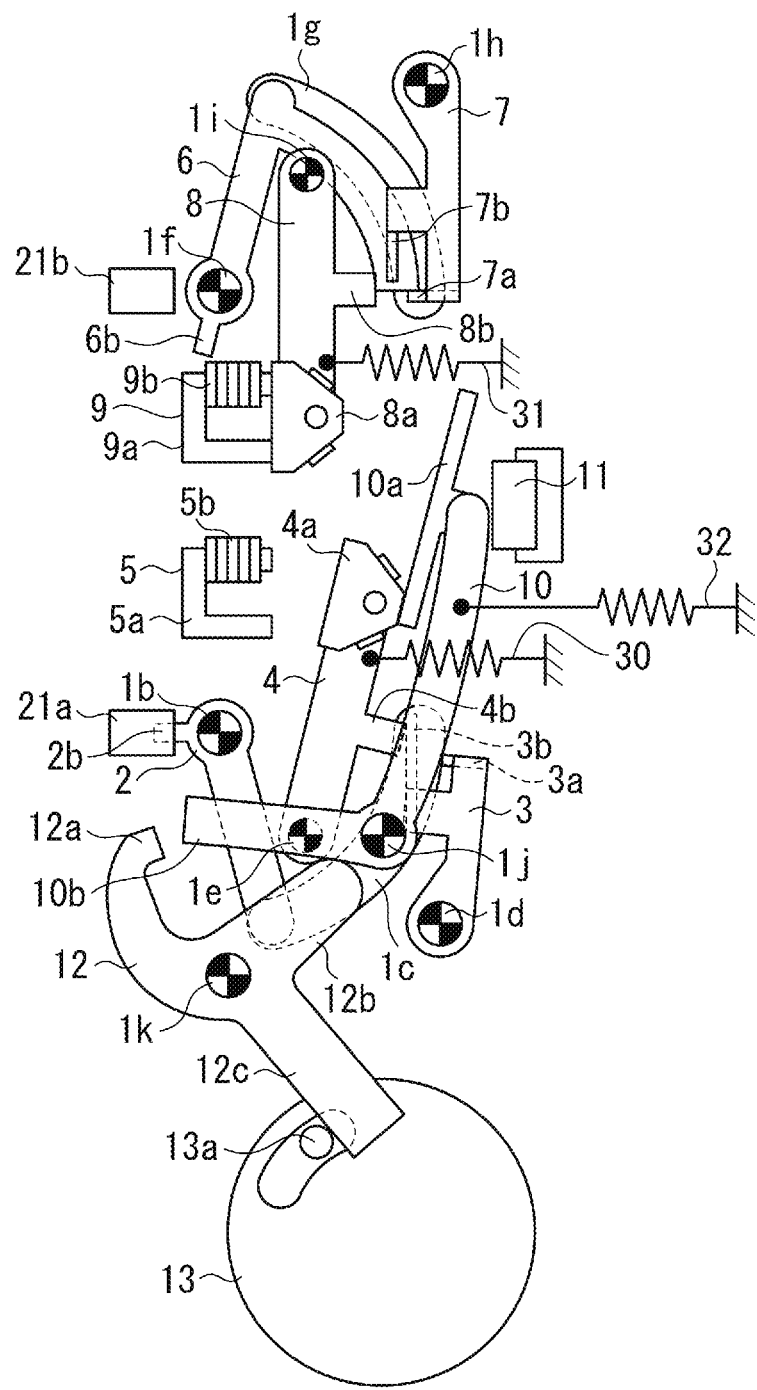
FIG. 10 is a plan view when the shutter driving part 101a of the shutter unit 101 is set in a state D' illustrated in FIG. 3.

When the state illustrated in FIG. 10 is set, the application of the voltage Ve to the body release actuator 13 continues. The holding lever 10 accordingly maintains the same state as that illustrated in FIG. 9. As illustrated in FIG. 10, the light shielding part 2b is formed in the leading blade driving lever 2. When the leading blade driving lever 2 is set in the leading blade traveling completion state, the leading blade PI 21a detects the light shielding part 2b, and an output signal of the leading blade PI 21a changes from H to L.

At timing determined based on the exposure time set after the CPU of the digital camera body 100 has cut off the voltage applied to the leading blade coil 5b, the CPU of the digital camera body 100 cuts off the voltage applied to the trailing blade coil 9b.

After the CPU of the digital camera body 100 has cut off the voltage applied to the trailing blade coil 9b, the trailing blade armature 8a is separated from the trailing blade electromagnet 9, and the trailing blade release lever 8 is rotated anticlockwise by the biasing force of the spring 31.

When the trailing blade release lever 8 rotates, the trailing blade locking pressing part 8b presses the trailing blade locking pressed part 7b. When the trailing blade locking pressed part 7b is pressed, the trailing blade locking lever 7 rotates anticlockwise to release engagement between the trailing blade locking part 7a and the trailing blade driving lever 6. The trailing blade driving lever 6 rotates clockwise to be set in a trailing blade traveling completion state illustrated in FIG. 11. The state illustrated in FIG. 11 corresponds to a state E' in the timing chart of FIG. 8.

Figure 11:
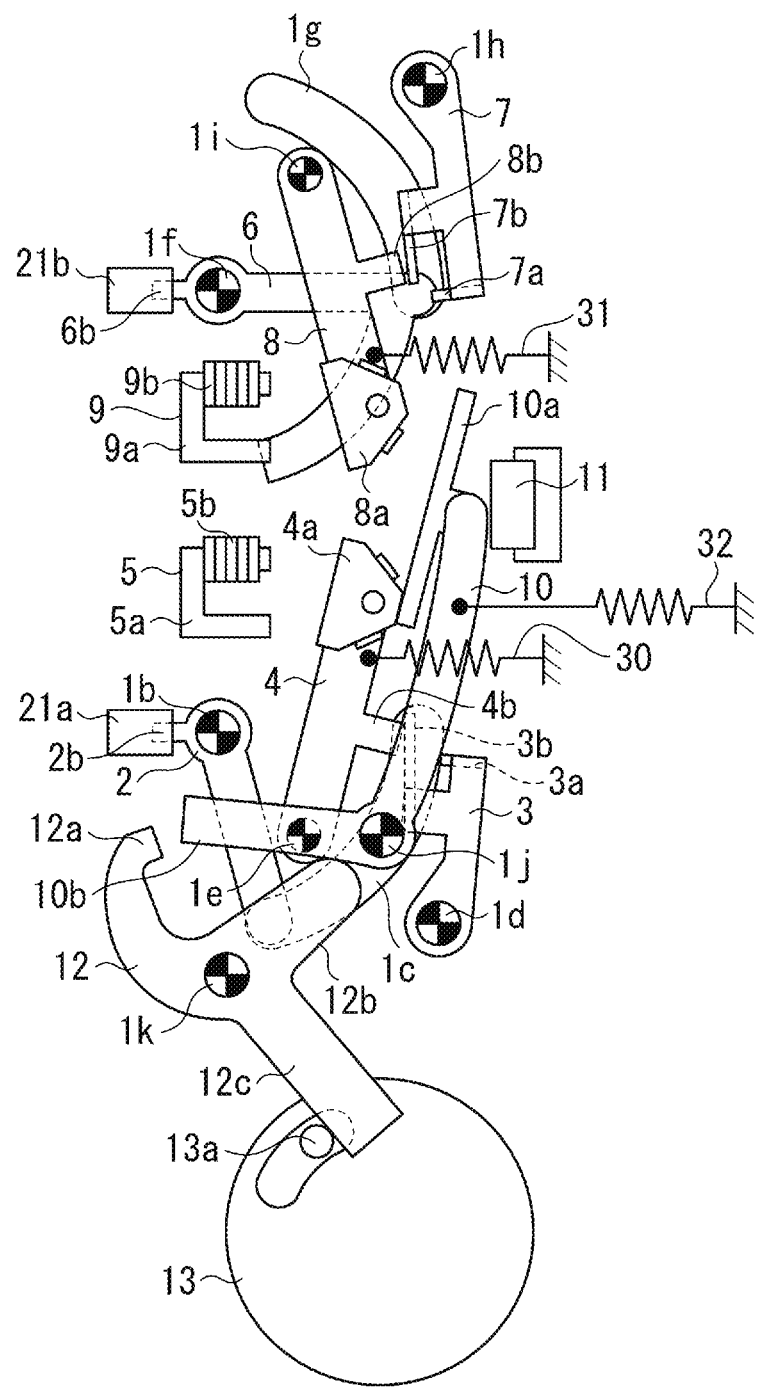
FIG. 11 is a plan view when the shutter driving part 101a of the shutter unit 101 is set in a state E' illustrated in FIG. 3.

When the state illustrated in FIG. 11 is set, the CPU of the digital camera body 100 continues the application of the voltage Ve to the body release actuator 13. The holding lever 10 accordingly maintains the same state as that illustrated in FIGS. 9 and 10.

As illustrated in FIG. 11, the light shielding part 6b is formed in the trailing blade driving lever 6. When the trailing blade driving lever 6 is set in the trailing blade traveling completion state, the trailing blade PI 21b detects the light shielding part 6b, and an output signal from the trailing blade PI 21b changes from H to L.

As illustrated in the timing chart of FIG. 8, after the change of the output signal of the trailing blade PI 21b from H to L, the application of the voltage Ve to the body release actuator 13 is stopped.

The timing chart of FIG. 8 illustrates time Tc from unenergization of the leading blade coil 5b to releasing of the light shielding state of the aperture 1a by the leading blade group 2a. In the second operation sequence, time Ts2 illustrated in FIG. 8 is a release time lag. The time Ts2 is shorter than the time Ts1 illustrated in FIG. 3.

The timing chart of FIG. 8 illustrates time Td from unenergization of the leading blade coil 5b to setting of a signal of the trailing blade PI 21b to L. In the second operation sequence, time Tv2 illustrated in FIG. 8 is energization time of the body release actuator 13 by the CPU of the digital camera body 100. The time Tv2 is longer than the time Tv1 illustrated in FIG. 3.

Thus, in the second operation sequence, the CPU of the digital camera body 100 energizes the body release actuator 13 until the trailing blade driving lever 6 is set in a trailing blade traveling completion state. As a result, bounding of the holding lever 10 can be suppressed while the power consumption of the digital camera body 100 is greater than that in the first operation sequence.

Time from disengagement between the body release lever locking part 12a and the holding lever locking part 10b to disengagement between the leading blade locking lever 3 and the leading blade driving lever 2 by the leading blade release lever 4 is accordingly shorter than that in the first operation sequence.

Figure 12:
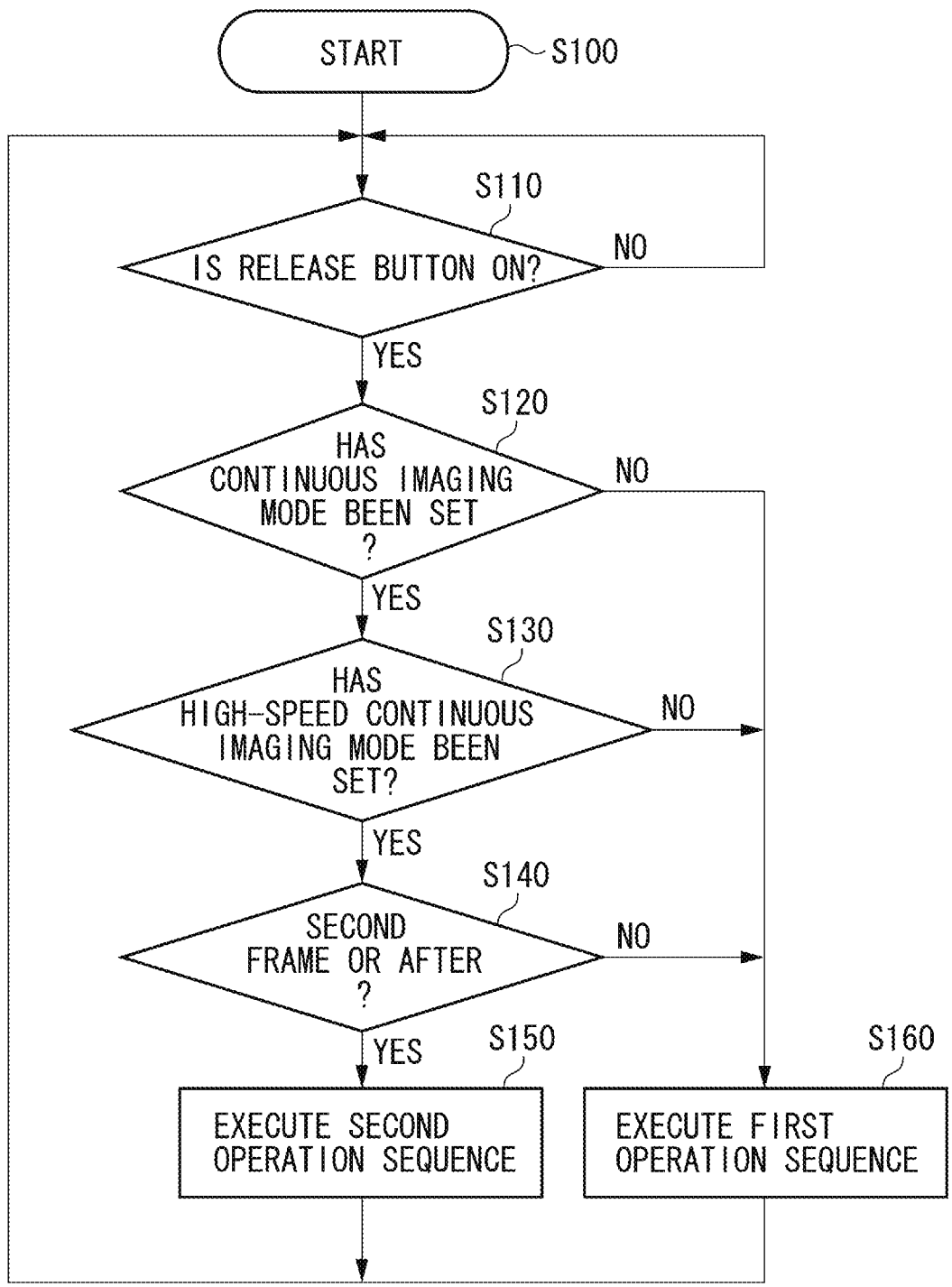
FIG. 12 is a flowchart illustrating an operation flow of the digital camera body 100.

FIG. 12 is a flowchart illustrating an operation flow of the digital camera body 100. This flowchart illustrates only a switching portion to determine which of the first and second operation sequences the shutter unit 10 executes based on a camera imaging mode set by the operation unit 180.

In step S100, the processing is started. When the release button is pressed (YES in step S110), in step S120, the operation unit 180 determines whether a continuous imaging mode is set. When a low-speed or high-speed continuous imaging mode is set (YES in step S120), the processing proceeds to step S130. When a single imaging mode is set (NO in step S120), the processing proceeds to step S160.

In step S130, the operation unit 180 determines whether the high-speed continuous imaging mode is set. When the high-speed continuous imaging mode is set (YES in step S130), the processing proceeds to step S140. When the low-speed continuous imaging mode is set (NO in step S130), the processing proceeds to step S160.

In step S140, the operation unit 180 determines whether image-capturing in the high-speed continuous imaging mode is for a second frame or after. When the image-capturing in the high-speed continuous imaging mode is for the second frame or after (YES in step S140), the processing proceeds to step S150. When image-capturing in the high-speed continuous imaging mode is for a first frame (NO in step S140), the processing proceeds to step S160.

In step S150, the shutter unit 101 executes the second operation sequence. In step S160, the shutter unit 101 executes the first operation sequence.

In the digital camera body 100, when the camera imaging mode is set to the high-speed continuous imaging mode, and the image-capturing in the high-speed continuous imaging mode is for the second frame or after, the shutter unit 101 executes the second operation sequence.

On the other hand, when the camera imaging mode is set to the single imaging mode or the low-speed continuous imaging mode, and the image-capturing in the high-speed continuous imaging mode is for the first frame, the shutter unit 101 executes the first operation sequence.

In the present exemplary embodiment, when the camera imaging mode is set to the high-speed continuous imaging mode, and the image-capturing in the high-speed continuous imaging mode is for the second frame or after, priority is placed on a frame speed per second (number of pictures to be taken per second) over reduction of power consumption of the digital camera body 100.

In a case of the image-capturing for the first frame in the high-speed continuous imaging mode, diaphragm driving based on a light metering result takes time. Hence, even when the shutter unit 101 executes the second operation sequence, the frame speed per second is not increased. For this reason, in the case of the image-capturing for the first frame in the high-speed continuous imaging mode, priority is placed on reduction of power consumption of the digital camera body 100 by executing the first operation sequence by the shutter unit 101.

When the camera imaging mode is set to the single imaging mode or the low-speed continuous imaging mode, priority is placed on reduction of power consumption of the digital camera body 100 over a frame speed per second (number of pictures to be taken per second).

In the exemplary embodiment described above, the case is described in which the mode can be switched to any one of the single imaging mode, the low-speed continuous imaging mode, and the high-speed continuous imaging mode by the operation unit 180. A modified example where the camera is switched to one of the single imaging mode and the continuous imaging mode by the operation unit 180 is described.

In this modified example, in a case of image-capturing for the second frame or after in the continuous imaging mode, the shutter unit 101 executes the second operation sequence. In a case of image-capturing for the first frame in the single imaging mode or the continuous imaging mode, the shutter unit 101 executes the first operation sequence.

To simplify the operation flow, in the case of the image-capturing in the continuous imaging mode, even for the first frame, the shutter unit 101 may execute the second operation sequence. In the case of the single imaging mode, the shutter unit 101 may execute the first operation sequence.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-093242 filed Apr. 19, 2011, which is hereby incorporated by reference herein in its entirety.

What is claimed is:

1. An imaging apparatus comprising:
a blade driving member which moves between a before-traveling position and a traveling completion position;
a first release member in which an armature is provided;
an electromagnet which attracts the armature by being energized;
a holding member which moves between a holding position where the holding lever holds the first release member so that the armature contacts the electromagnet, and a retracting position where the holding member is retracted out of a moving locus of the first release member;
a biasing member which urges the holding member to the retracting position;
a second release member which moves between a locking position where the second release member locks the holding member in the holding position against a biasing force of the biasing member and a releasing position where the second release member releases the holding member;
a driving source which drives the second release member from the locking position to the releasing position; and
an energization control unit which controls energization of the driving source,
wherein in a case where the armature contacts the electromagnet, the first release member locks the blade driving member in the before-traveling position,
wherein the energization control unit has a first control mode and a second control mode,
wherein in a case where the energization control unit controls energization of the driving source in the first control mode, the driving source is energized from after the electromagnet attracts the armature until the second release member moves from the locking position to the releasing position, and
wherein in a case where the energization control unit controls energization of the driving source in the second control mode, the driving source is energized from after the electromagnet attracts the armature until the blade driving member is in the traveling completion position.

2. The imaging apparatus according to claim 1,
wherein in a first frame of the continuous image-capturing, the energization control unit controls the energization of the driving source in the first control mode; and
wherein in a second frame or after in the continuous image-capturing, the energization control unit controls the energization of the driving source in the second control mode.

3. The imaging apparatus according to claim 1,
wherein the energization control unit controls energization of the driving source in the first control mode when the imaging apparatus executes normal image-capturing, and controls the energization of the driving source in the second control mode when the imaging apparatus executes continuous image-capturing.

4. The imaging apparatus according to claim 1,
wherein in a case where the energization control unit controls energization of the driving source in the second control mode, the energization control unit energizes a first energization amount to the driving source to move the second release lever from the locking position to the releasing position, and energizes a second energization amount to the driving source after the second release lever has moved from the locking position to the releasing position, wherein the second energization amount is lower than the first energization amount.

5. The imaging apparatus according to claim 1,
wherein in a case where the energization control unit controls energization of the driving source in the second control mode, the energization control unit applies a first voltage to the driving source to move the second release lever from the locking position to the releasing position, and applies a second voltage to the driving source after the second release lever has moved from the locking position to the releasing position,
wherein the second voltage is lower than the first voltage.

6. An imaging apparatus comprising:
a blade driving member which moves between a before-traveling position and a traveling completion position;
a detection unit which detects whether the blade driving member is in a predetermined position;
a first release member in which an armature is provided;
a holding member which moves between a holding position where the holding lever holds the first release member so that the armature contacts the electromagnet, and a retracting position where the holding member is retracted out of a moving locus of the first release member;
a biasing member which urges the holding member to the retracting position;
a second release member which moves between a locking position where the second release member locks the holding member in the holding position against a biasing force of the biasing member and a releasing position where the second release member releases the holding member;
a driving source which drives the second release member from the locking position to the releasing position; and
an energization control unit which controls energization of the driving source,
wherein in a case where the armature contacts the electromagnet, the first release member locks the blade driving member in the before-traveling position,
wherein the energization control unit has a first control mode and a second control mode,
wherein in a case where the energization control unit controls energization of the driving source in the first control mode, the driving source is energized from after the electromagnet attracts the armature until the second release member moves from the locking position to the releasing position, and wherein in a case where the energization control unit controls energization of the driving source in the second control mode, the driving source is energized from after the electromagnet attracts the armature until the detection unit detects that the blade driving member is in the predetermined position.

7. The imaging apparatus according to claim 6,
wherein in a first frame of the continuous image-capturing, the energization control unit controls the energization of the driving source in the first control mode; and
wherein, in a second frame or after in the continuous image-capturing, the energization control unit controls the energization of the driving source in the second control mode.

8. The imaging apparatus according to claim 6,
wherein the energization control unit controls energization of the driving source in the first control mode when the imaging apparatus executes normal image-capturing, and controls the energization of the driving source in the second control mode when the imaging apparatus executes continuous image-capturing.

9. The imaging apparatus according to claim 6,
wherein in a case where the energization control unit controls energization of the driving source in the second control mode, the energization control unit energizes a first energization amount to the driving source to move the second release lever from the locking position to the releasing position, and energizes a second energization amount to the driving source after the second release lever has moved from the locking position to the releasing position,
wherein the second energization amount is lower than the first energization amount.

10. The imaging apparatus according to claim 6,
wherein in a case where the energization control unit controls energization of the driving source in the second control mode, the energization control unit applies a first voltage to the driving source to move the second release lever from the locking position to the releasing position, and applies a second voltage to the driving source after the second release lever has moved from the locking position to the releasing position,
wherein the second voltage is lower than the first voltage.

* * * * *